(12) United States Patent
Repko et al.

(10) Patent No.: US 11,059,469 B2
(45) Date of Patent: Jul. 13, 2021

(54) BRAKE CYLINDER WITH PARKING BRAKE MECHANISM

(71) Applicant: Westinghouse Air Brake Technologies Corporation, Wilmerding, PA (US)

(72) Inventors: Ryan Repko, Delmont, PA (US); Nicholas Lee Bressler, Export, PA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 47 days.

(21) Appl. No.: 16/400,470

(22) Filed: May 1, 2019

(65) Prior Publication Data
US 2020/0346629 A1 Nov. 5, 2020

(51) Int. Cl.
*B60T 17/16* (2006.01)
*F16H 63/34* (2006.01)
*F16D 65/46* (2006.01)

(52) U.S. Cl.
CPC .............. *B60T 17/16* (2013.01); *F16D 65/46* (2013.01); *F16H 63/3425* (2013.01)

(58) Field of Classification Search
CPC ...... B60T 13/665; B60T 13/365; B60T 17/16; B60T 17/08; B60T 17/086; F16D 65/46; F16H 63/3425
See application file for complete search history.

(56) References Cited

U.S. PATENT DOCUMENTS

| | | | | |
|---|---|---|---|---|
| 2,514,588 A | * | 7/1950 | Nystrom | B60T 13/44 188/200 |
| 3,759,147 A | * | 9/1973 | Johnsson | B60T 17/083 92/19 |
| 3,874,747 A | * | 4/1975 | Case | B60T 17/16 303/89 |
| 3,895,695 A | | 7/1975 | Hunter | |
| 4,596,426 A | * | 6/1986 | Clapp | B60T 13/403 137/597 |
| 6,854,570 B2 | | 2/2005 | Connell | |

(Continued)

FOREIGN PATENT DOCUMENTS

WO 201715184 A1 9/2017

OTHER PUBLICATIONS

Examination report No. 1 dated Jan. 5, 2021 for corresponding patent application No. 2020202656 (4 pages).

*Primary Examiner* — Thomas W Irvin
(74) *Attorney, Agent, or Firm* — Mary D. Lawlor; The Small Patent Law Group LLC

(57) ABSTRACT

A brake cylinder for a railway vehicle includes a body, a piston assembly including a piston member and a rod having a threaded surface, and a parking brake locking mechanism including a working nut, a locking gear, and a locking pawl, with the working nut having a threaded surface engaged with the threaded surface of the rod. The piston member has a first position and a second position in a direction extending from the second end of the body toward the first end of the body. The working nut is fixed relative to the locking gear. The locking pawl has an unlocked position spaced from the locking gear and a locked position engaged with the locking gear. The piston is restricted from moving from the second position to the first position when the locking pawl is in the locked position.

20 Claims, 17 Drawing Sheets

(56) References Cited

U.S. PATENT DOCUMENTS

| | | |
|---|---|---|
| 7,140,477 B2 | 11/2006 | Engle et al. |
| 7,163,090 B2 | 1/2007 | Huber, Jr. et al. |
| 7,249,659 B2 | 7/2007 | Huber, Jr. et al. |
| 7,377,370 B2 | 5/2008 | Huber, Jr. et al. |
| 8,006,815 B2* | 8/2011 | Sommerfeld ............ B60T 13/24 |
| | | 188/170 |
| 8,006,816 B2 | 8/2011 | Kraus et al. |
| 8,469,464 B2 | 6/2013 | Sommerfeld et al. |
| 8,915,337 B2* | 12/2014 | Furutani .................. B60T 1/04 |
| | | 188/202 |
| 9,517,753 B2* | 12/2016 | Koziol ..................... F16C 27/08 |
| 9,623,855 B2 | 4/2017 | Huber et al. |
| 9,694,803 B2 | 7/2017 | Huber et al. |
| 9,821,822 B2 | 11/2017 | Huber, Jr. et al. |
| 9,956,971 B2 | 5/2018 | Gerber-Papin et al. |
| 10,106,179 B2* | 10/2018 | Huber, Jr. ............. B60T 13/665 |
| 10,501,097 B2* | 12/2019 | Huber, Jr. ............... B60T 17/16 |
| 2008/0179144 A1* | 7/2008 | Sommerfeld ......... B60T 17/086 |
| | | 188/33 |
| 2008/0251327 A1* | 10/2008 | Huber .................... B60T 17/16 |
| | | 188/33 |
| 2013/0098719 A1* | 4/2013 | Furutani ................ F16D 49/00 |
| | | 188/77 R |
| 2014/0231192 A1* | 8/2014 | Asano .................. B60T 17/086 |
| | | 188/74 |
| 2014/0262640 A1 | 9/2014 | Dewberry et al. |
| 2016/0288807 A1* | 10/2016 | Huber, Jr. ............... B61H 13/34 |
| 2018/0057027 A1 | 3/2018 | Huber, Jr. et al. |
| 2019/0054935 A1 | 2/2019 | Gaughan et al. |

\* cited by examiner

BRAKE CYLINDER WITH PARKING BRAKE MECHANISM

BACKGROUND OF THE INVENTION

Field of the Invention

The present invention relates to a brake cylinder for railway vehicles and, more particularly, to a brake cylinder with a parking brake mechanism.

Description of Related Art

Railroad freight cars have a brake pipe that runs through each car and is coupled therebetween so as to extend continuously the length of the train. The brake pipe is charged with compressed air typically at the head end by a compressor on a locomotive. The compressed air not only provides the pneumatic brake force at the respective cars, but also serves as a communication link via which the car's brakes are controlled from the locomotive by increasing and decreasing the brake pipe pressure. Brake equipment for railroad freight cars utilizes control valves to control the operation of the brake cylinders and brakes for the freight cars.

The brake system used on the railway cars typically employs a plurality of force transmitting members to convert supply of the pneumatic fluid pressure from the brake pipe into a mechanical force to apply and bias one or more brake shoes against the tread of one or more wheels of the railway car. When a single railway car or a plurality of railway cars are parked at a siding, or yard, the hand brake or parking brake on at least some of these railway cars is applied as a precaution against unwanted or unexpected movement of the cars. A typical railway car hand brake system normally consists of an apparatus for manually applying and biasing one or more brake shoes against the tread of one or more wheels of the railway car by either turning a hand wheel or pumping a ratchet handle on a hand brake mechanism attached to the railway car.

FIG. 1 shows a prior art car mounted brake assembly 10 for a railway vehicle. The car mounted brake assembly 10 includes a brake cylinder 12 having a piston push rod 13 connected to a cylinder force transfer lever 14. A slack adjuster 16 is also shown associated with the cylinder force transfer lever 14, and a pair of brake beams 18 and 20 are mounted at each end of the car mounted brake assembly 10. A hand brake 22, is also provided which is associated with the cylinder force transfer lever 14. The brake beams 18, 20 are actuated by the brake cylinder 12 or the hand brake 22, via the cylinder force transfer lever 14 and a series of additional levers and linkages. Brake levers are used throughout the braking system to transmit, increase, or decrease braking force, as well as to transfer or change direction of force. Thus, during a braking situation where a force is applied by the brake cylinder 12 or the hand brake 22, these levers and rods transmit and deliver braking forces to the brake beams 18 and 20 and, consequently, to the brake heads 24 and brake shoes 26 mounted thereon.

Referring to FIG. 2, a prior art truck mounted brake system 30 is shown. The hand brake mechanism 40 has a housing 42 including a back wall 44 mountable on a rail car and a cover 46. The cover 46 is secured to the back wall 44. A chain 48 for application or release of the brakes is connected to the brake rigging via a hand brake lever 50, and is attached to and wound on a winding drum 52. The hand brake lever 50 is, in turn, connected to a cylinder force transfer lever 64. In order to apply the brakes, a hand wheel 54 is rotated in a clockwise direction to wind the chain 48 about the winding drum 52 and to cause the hand brake lever 50 to be pulled in an outward direction away from the brake rigging 60. This causes the cylinder force transfer lever 64 to be rotated in a counterclockwise direction resulting in a piston push rod being pulled in an outward direction and the required force being applied to the slack adjuster assembly 68.

SUMMARY OF THE INVENTION

In one aspect, a brake cylinder for a railway vehicle includes a body having a first end and a second end, a piston assembly comprising a piston member received within the body and a rod having a threaded surface, and a parking brake locking mechanism. The piston member has a first position and a second position spaced from the first position in a direction extending from the second end of the body toward the first end of the body, with at least a portion of the rod extending from the body when the piston member is in the second position. The parking brake locking mechanism includes a working nut, a locking gear, and a locking pawl, with the working nut having a threaded surface engaged with the threaded surface of the rod. The working nut is fixed relative to the locking gear. The working nut and the locking gear are moveable relative to the rod, with the locking pawl having an unlocked position spaced from the locking gear and a locked position engaged with the locking gear. The piston is restricted from moving from the second position to the first position when the locking pawl is in the locked position.

The piston may be moveable from the second position to the first position when the locking pawl is in the unlocked position. The piston may be moveable from the first position to the second position when the locking pawl is in the locked position. The locking gear may include a plurality of teeth spaced around the circumference of the locking gear, with the locking pawl configured to engage one of the plurality of teeth when the locking pawl is in the locked position to prevent movement of the piston from the second position to the first position, and with the locking pawl configured to engage one of the plurality of teeth when the locking pawl is in the locked position and allow movement of the locking pawl and movement of the piston from the first position to the second position. The brake cylinder may further include at least one bearing engaged with at least one of the working nut and the locking gear. The body may include a non-pressure head, with the working nut and the locking gear received within the non-pressure head.

The rod may be restricted from rotating about a longitudinal axis of the rod relative to the body. The body may include one of a key and a keyway, and the rod may include the other of the key and the keyway, with the key received within the keyway and restricting rotation of the rod about the longitudinal axis of the rod relative to the body. The brake cylinder may further include a locking pawl actuation assembly configured to move the locking pawl between the locked and unlocked positions based on a signal pressure. The locking pawl actuation assembly may include a signal valve and a pawl valve, with the pawl valve in fluid communication with a locking cavity, and the pawl valve having a first position corresponding to the locked position of the locking pawl and a second position corresponding to the unlocked position of the locking pawl. The signal valve is in fluid communication with a signal pressure port, with the signal valve having a first position where the locking cavity is in fluid communication with atmospheric pressure and a second position where the locking cavity is in fluid communication with the signal pressure port. The locking pawl actuation assembly may further include a manual release mechanism configured to move the locking pawl from the locked position to the unlocked position. The manual release mechanism may include a swivel secured to the locking pawl and a rocking arm secured to the swivel, with the swivel rotatable relative to the locking pawl about a longitudinal axis defined by the locking pawl, and where movement of the rocking arm along the longitudinal axis defined by the locking pawl is configured to move the locking pawl from the locked position to the unlocked position.

The signal valve may include a bushing, a spool valve member, and a signal spring, with the bushing defining a bushing port in fluid communication with the locking cavity, and the signal spring biasing the signal valve toward the first position. The spool valve member having a first side and a second side positioned opposite from the first side, with the second side of the spool valve member in fluid communication with the signal pressure port, the spool valve member isolating the bushing port from the signal pressure port when the spool valve is in the first position, and the spool valve member allowing fluid communication between the bushing port and the signal pressure port when the spool valve is in the second position. The pawl valve may include a diaphragm, a pawl valve member secured to the diaphragm, and a locking spring, with the diaphragm having a first side and a second side positioned opposite the first side, the first side of the diaphragm in fluid communication with atmospheric pressure, the second side of the diaphragm in fluid communication with the locking cavity, the locking spring biasing the locking pawl toward the locked position, and the pawl valve member configured to move the locking pawl to the unlocked position when a pressure within the locking cavity is greater than a biasing force of the locking spring.

In a further aspect, the locking pawl actuation assembly may include a valve member and a locking spring, with the valve member having a first side and a second side positioned opposite the first side, the second side of the valve member in fluid communication with a signal pressure port, the first side of the valve member in fluid communication with atmospheric pressure, the locking spring biasing the locking pawl toward the locked position, the valve member having a first position corresponding to the locked position of the locking pawl and a second position corresponding to the unlocked position of the locking pawl, and the valve member configured to move the locking pawl to the unlocked position when a pressure acting on the second side of the valve member is greater than a biasing force of the locking spring. The valve member of the locking pawl actuation assembly may include a seal and a valve body.

In another aspect, the locking pawl actuation assembly may include a valve member, a diaphragm having a first side and a second side positioned opposite the first side, a signal spring, and a locking spring, with the valve member having a first position corresponding to the locked position of the locking pawl and a second position corresponding to the unlocked position of the locking pawl, the locking spring biasing the locking pawl toward the locked position, the signal spring biasing the valve member toward the first position, the second side of the diaphragm in fluid communication with a signal pressure port, and the valve member configured to move the locking pawl to the unlocked position when a pressure acting on the second side of the diaphragm is greater than a biasing force of the signal spring and the locking spring.

Further details and advantages of the various aspects or embodiments of the disclosure detailed herein will become clear upon reviewing the following detailed description and accompanying drawing figures.

DETAILED DESCRIPTION

Figure 1:
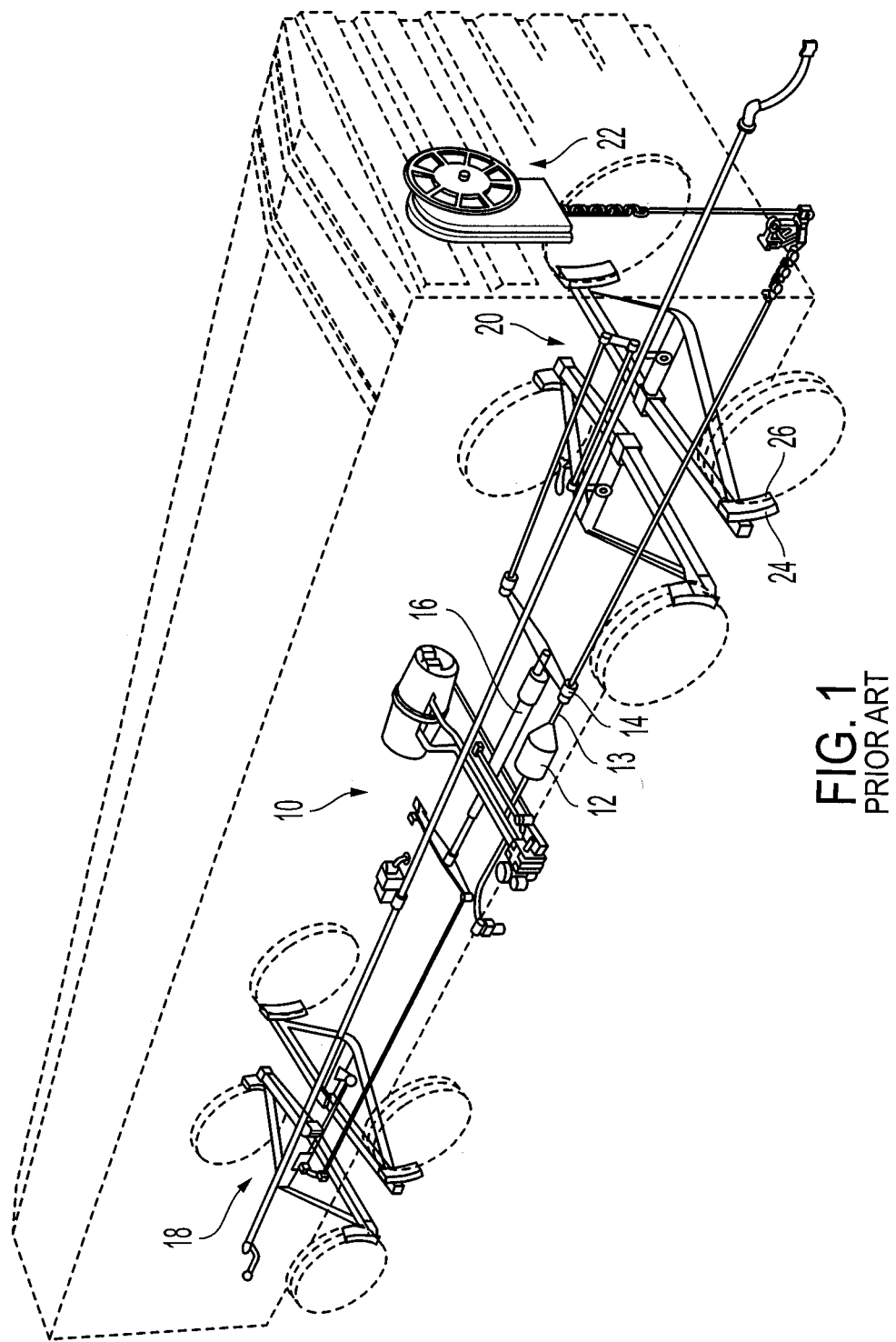
FIG. 1 is a perspective view of a conventional braking system and hand brake for a railway vehicle.
Figure 2:
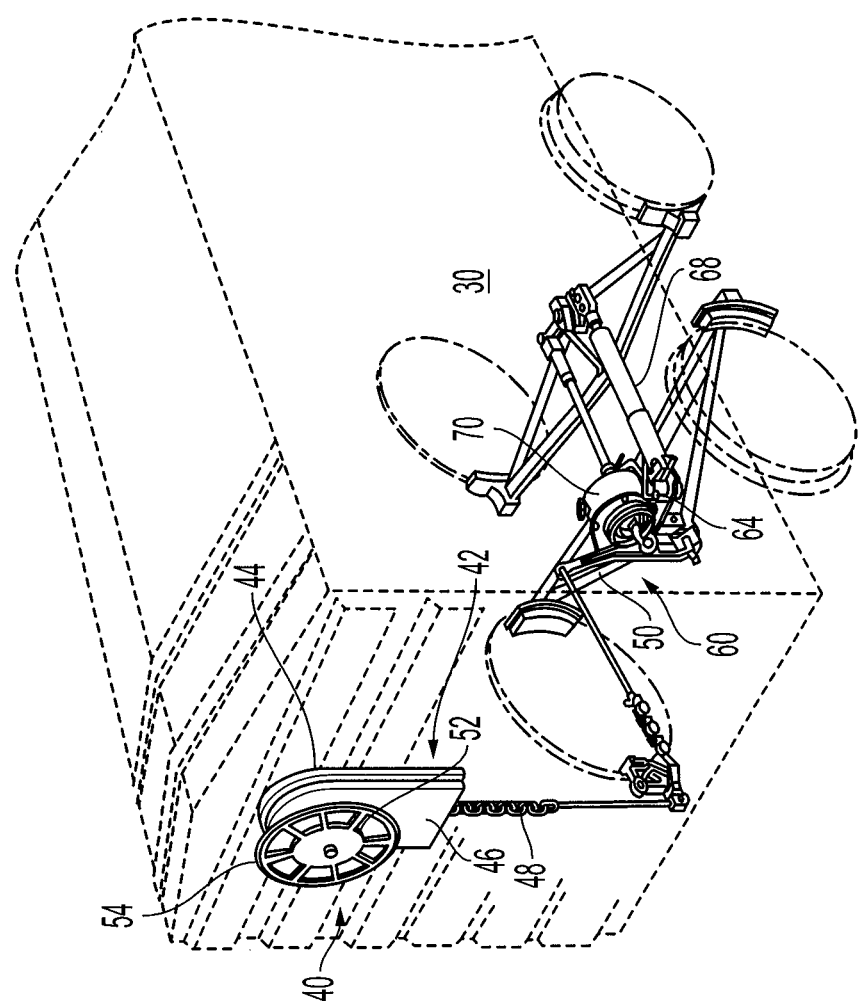
FIG. 2 is a perspective view of a further conventional braking system and hand brake for a railway vehicle.
Figure 3:
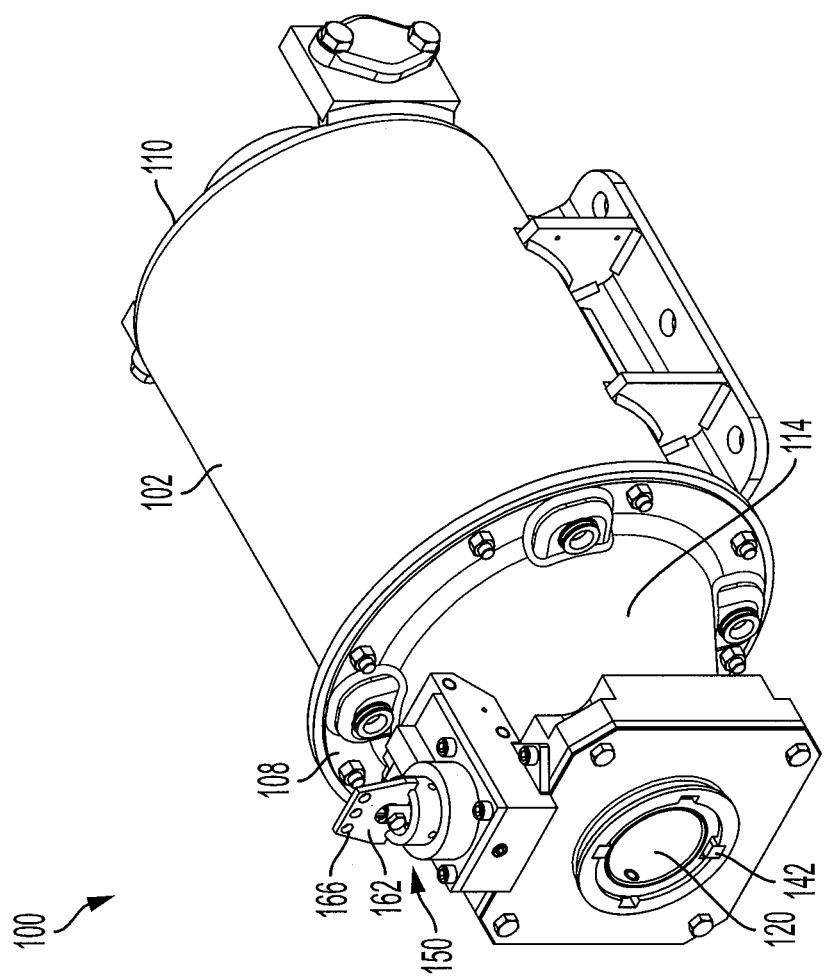
FIG. 3 is a front perspective view of a brake cylinder for a railway vehicle according to one aspect of the present invention.
Figure 4:
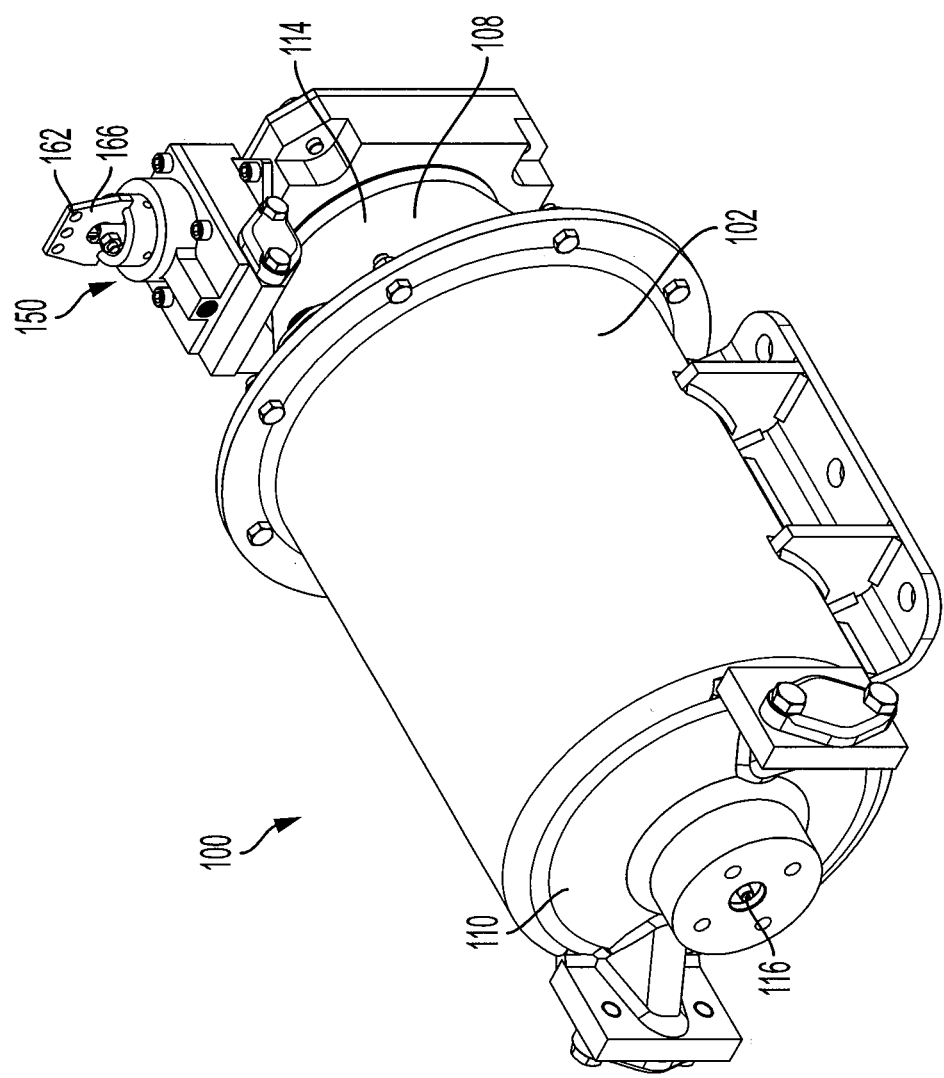
FIG. 4 is a rear perspective view of the brake cylinder of FIG. 3.
Figure 5:
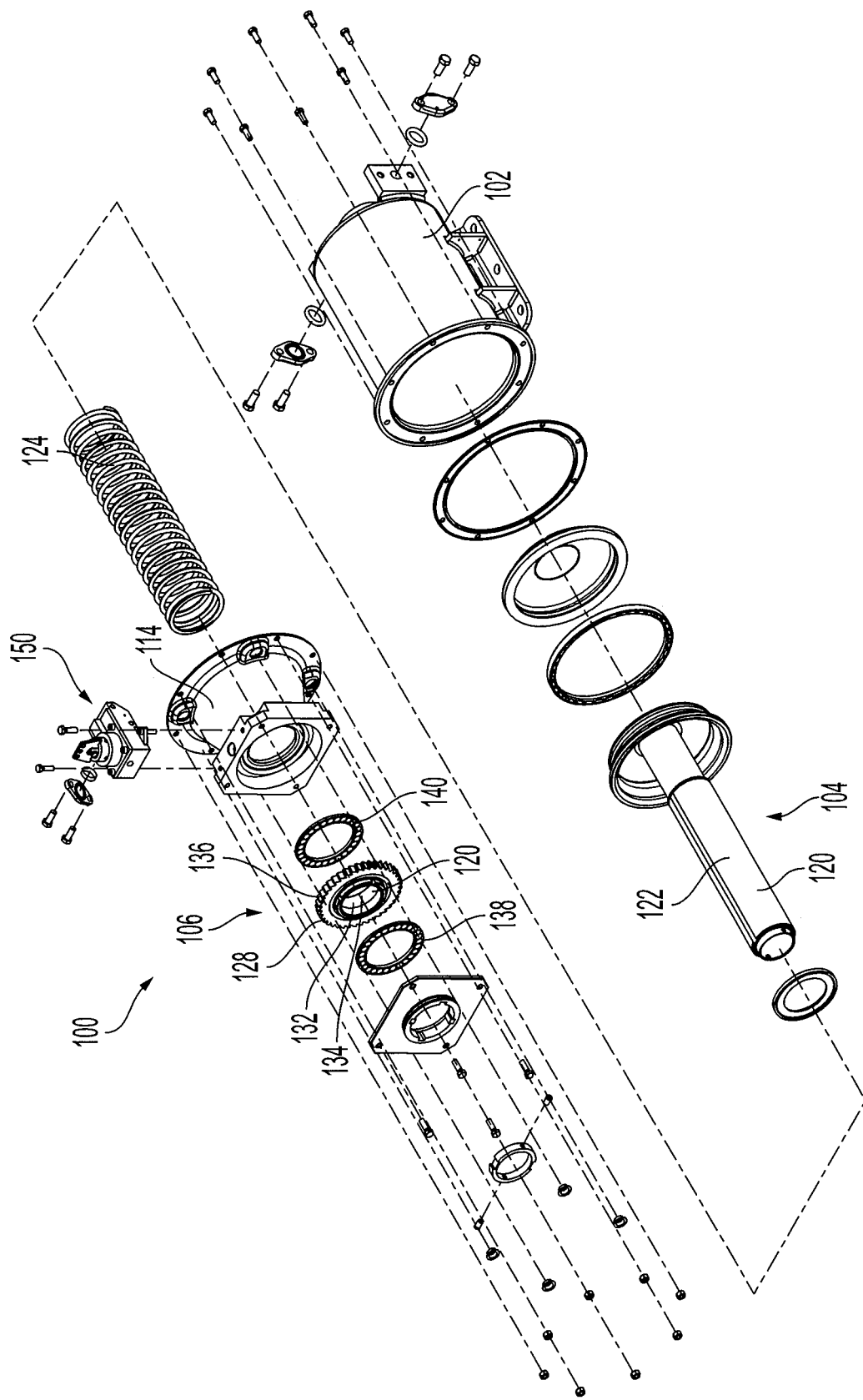
FIG. 5 is an exploded perspective view of the brake cylinder of FIG. 3.

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Referring to FIGS. 3-17, a brake cylinder with a parking brake mechanism 100 for a railway vehicle includes a body 102, a piston assembly 104, and a parking brake locking mechanism 106. The brake cylinder 100 is configured to apply a force to a brake system on a railway vehicle, such as a railway freight car, such that a brake shoe engages a wheel of the railway vehicle. As detailed below, the parking brake locking mechanism 106 is configured to lock the brake cylinder 100 in an applied position to ensure the brake shoe remains engaged with the wheel of the railway vehicle. More specifically, the parking brake locking mechanism 106 is configured to automatically engage to mechanically prevent the release of the application of the brake cylinder 100, even when brake cylinder air pressure is reduced to atmospheric air pressure, while still allowing for the brake cylinder 100 to be extended. The parking brake locking mechanism 106 is also configured to remain disengaged to allow normal operation of the brake cylinder 100. As detailed below, the parking brake locking mechanism 106 is configured to be used as a standalone device that is a signaled using brake pipe air pressure or utilized in connection with an automatic parking brake pneumatic control valve, which would provide an on/off pressure signal to the parking brake locking mechanism 106. One example of an automatic parking brake pneumatic control valve is shown and described in International Publication No. WO 2017/151854, which is hereby incorporated by reference in its entirety.

Referring to FIGS. 3-8, the body 102 has a first end 108 and a second end 110 positioned opposite to the first end 108. The body 102 defines an interior space 112. The body 102 is cylindrical, although other suitable shapes and configurations may be utilized. The body 102 includes a non-pressure head 114 at the first end 108 of the body 102. The body 102 includes a brake cylinder pressure port 116 at the second end 110 of the body 102. The piston assembly 104 includes a piston member 118 received within the interior space 112 of the body 102 and a rod 120 having a threaded surface 122. The piston member 118 is fixed relative to the rod 120. The piston member 118 is moveable within the interior space 112 of the body 102 between a first position (FIG. 7) and a second position (FIG. 8) spaced from the first position in a direction extending from the second end 110 of the body 102 toward the first end 108 of the body 102. A spring 124 biases the piston member 118 toward the first position. Air pressure from the brake cylinder pressure port 116 is configured to move the piston member 118 from the first position to the second position. At least a portion of the rod 120 extends from the body 102 when the piston member 118 is in the second position.

Figure 17:
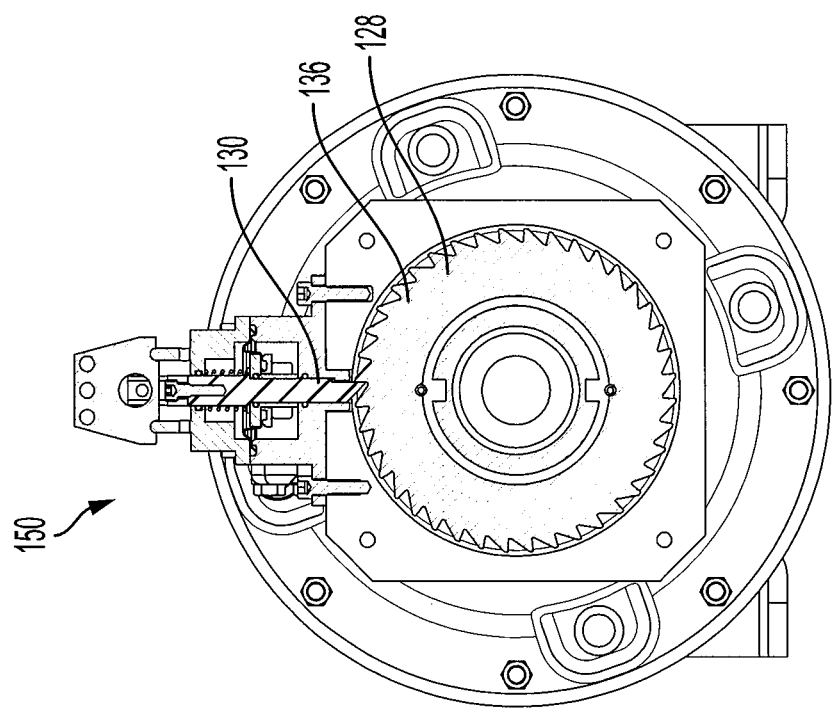
FIG. 17 is a cross-sectional view of the brake cylinder of FIG. 3, showing a parking brake locking mechanism in a locked position.
Figure 16:
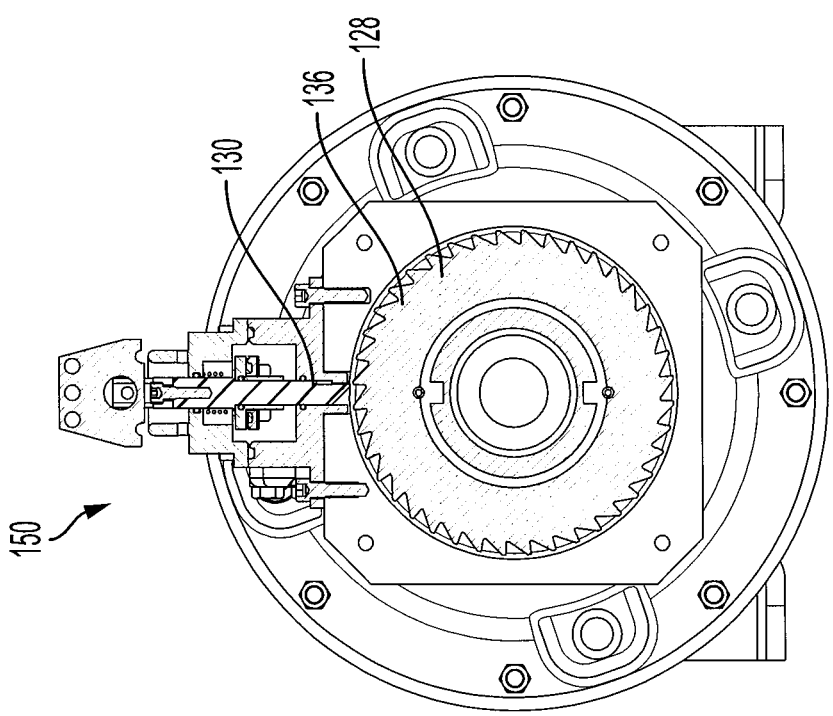
FIG. 16 is a cross-sectional view of the brake cylinder of FIG. 3, showing a parking brake locking mechanism in an unlocked position.

Referring to FIGS. 3-17, the parking brake locking mechanism 106 includes a working nut 126, a locking gear 128, and a locking pawl 130. The working nut 126 has a threaded surface 132 engaged with the threaded surface 122 of the rod 120. The working nut 126 is fixed relative to the locking gear 128. The working nut 126 may be formed separately and secured to the locking gear 128 or may be formed integrally with the locking gear 128. The working nut 126 defines a central opening 134 that receives the rod 120. The working nut 126 and the locking gear 128 are moveable relative to the rod 120. As shown in FIGS. 16 and 17, the locking pawl 130 has an unlocked position spaced from the locking gear 128 and a locked position engaged with the locking gear 128. The piston member 118 is restricted from moving from the second position to the first position when the locking pawl 130 is in the locked position. When the locking pawl 130 is in the unlocked position (FIG. 16), movement of the rod 120 causes the threaded surface 122 of the rod 120 to engage the threaded surface 132 of the working nut 126 thereby causing rotation of the working nut 126 and the locking gear 128 relative to the body 102 and the rod 120 when the piston member 118 is moved from the first position to the second position and from the second position to the first position. When the locking pawl 130 is in the locked position (FIG. 17), the threaded surface 122 of the rod 120 engages the threaded surface 132 of the working nut 126, but the piston member 118 can only move from the first position toward the second position and not from the second position toward the first position due to the engagement between the locking pawl 130 and the locking gear 128. In one aspect, the locking gear 128 and locking pawl 130 form a ratchet arrangement such that when the locking pawl 130 is in the locked position (FIG. 17), rotation of the working nut 126 and the locking gear 128 in a counter-clockwise direction, as viewed in FIG. 17, is prevented by the locking pawl 130 while still allowing rotation of the working nut 126 and the locking gear 128 in a clockwise direction, as viewed in FIG. 17.

Figure 10:
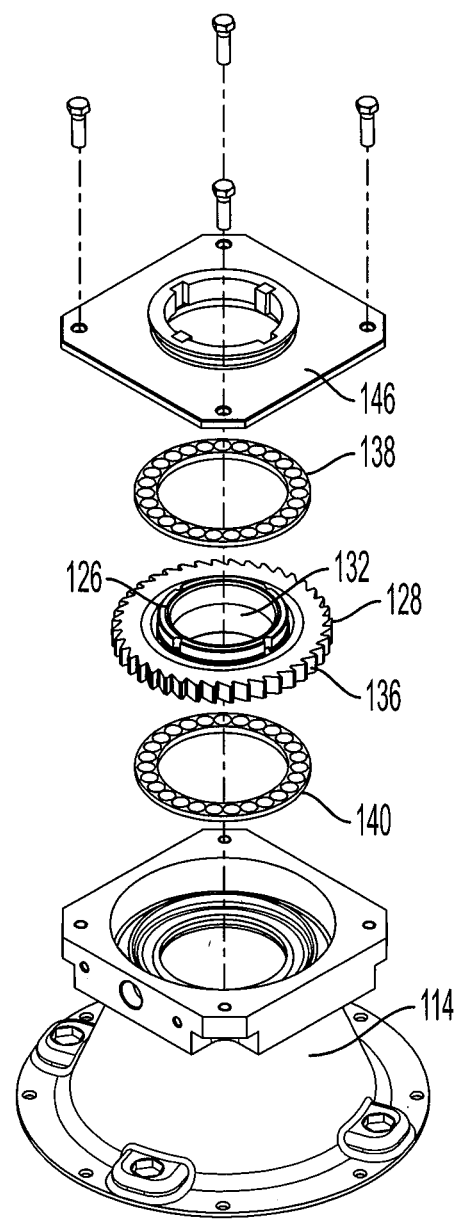
FIG. 10 is an exploded perspective view of a non-pressure head of the brake cylinder of FIG. 3.

Referring to FIG. 10, the locking gear 128 is annular and includes a plurality of teeth 136 spaced around a circumference of the locking gear 128. The locking pawl 130 is configured to engage one of the plurality of teeth 136 when the locking pawl 130 is in the locked position to prevent movement of the piston member 118 from the second position to the first position. The locking pawl 130 is configured to engage one of the plurality of teeth 136 when the locking pawl 130 is in the locked position and allow movement of the locking pawl 130 and movement of the piston member 118 from the first position to the second position. In other words, the locking pawl 130 and the plurality of teeth 136 of the locking gear 128 are configured to prevent the retraction or release of the brake cylinder 100 while allowing the extension or application of the brake cylinder 100 due to the ratchet and pawl structure of the locking pawl 130 and the plurality of teeth 136. The locking pawl 130 may engage one or more of the plurality of teeth 136 of the locking gear 128 when the locking pawl 130 is in the locked position. First and second bearings 138, 140 are engaged with the working nut 126 and the locking gear 128 to facilitate the rotation of the working nut 126 and locking gear 128 relative to the rod 120 and the body 102. The first bearing 138 is positioned on one side of the working nut 126 and locking gear 128 and the second bearing 140 is positioned on the other side of the working nut 126 and locking gear 128. The working nut 126, the locking gear 128, and the bearings 138, 140 are received within the non-pressure head 114 of the body 102, although other suitable arrangements may be utilized. The first and second bearings 138, 140 may be thrust bearings, although other suitable bearing arrangements may be utilized.

Figure 6:
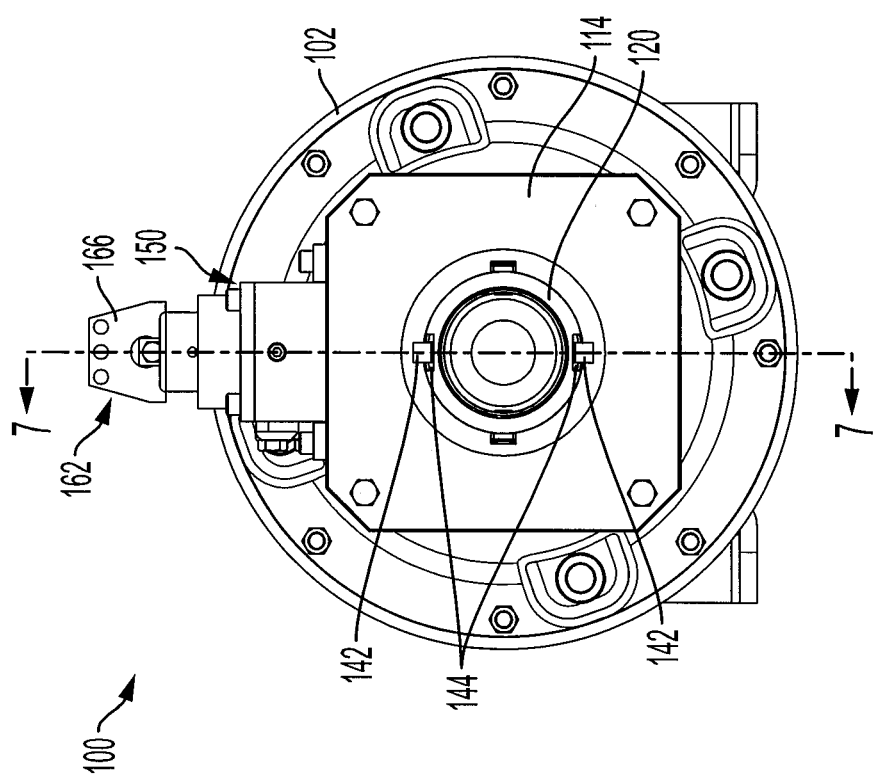
FIG. 6 is a front view of the brake cylinder of FIG. 3.
Figure 7:
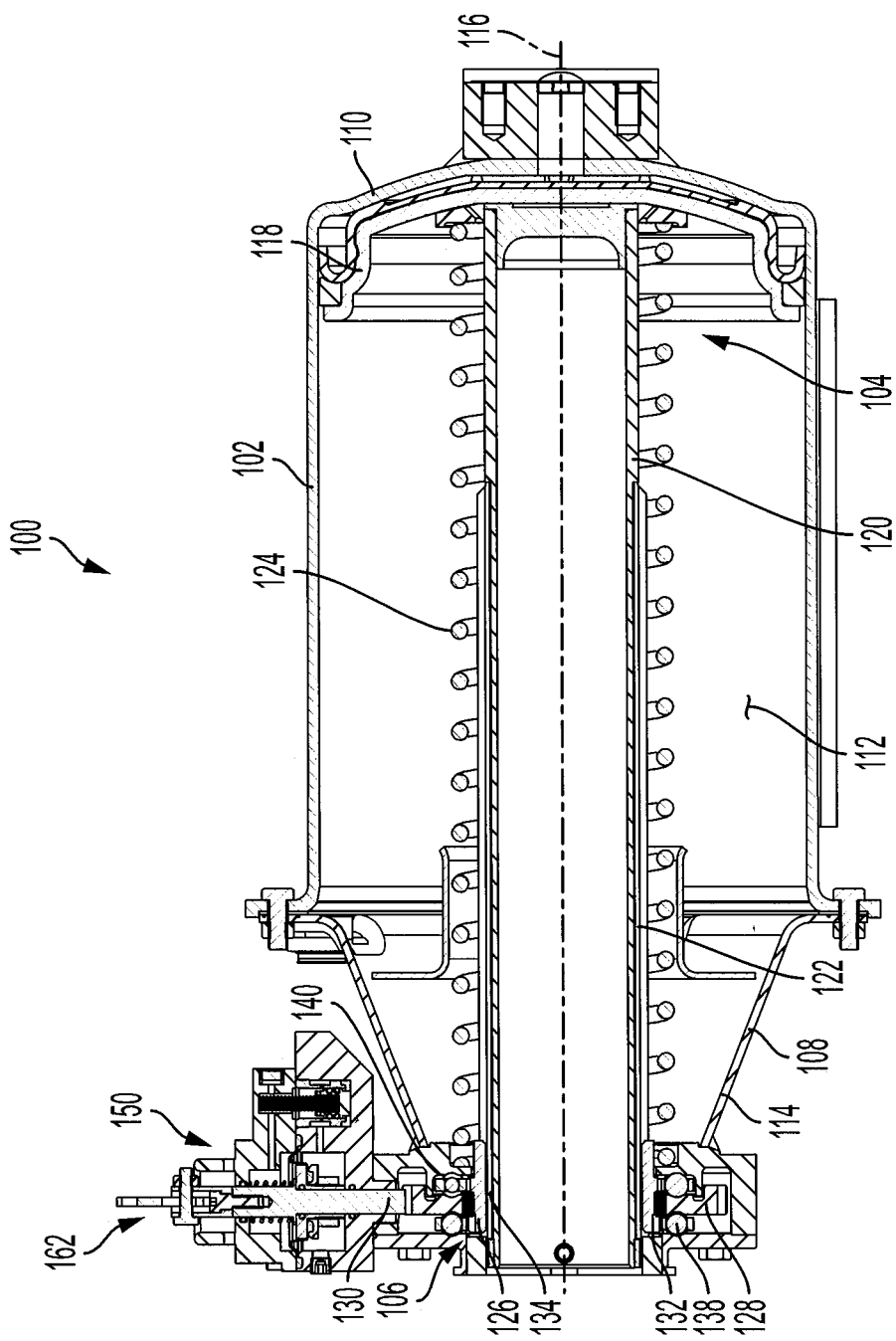
FIG. 7 is a cross-sectional view taken along line 7-7 in FIG. 6, showing a first position of a piston of the brake cylinder.
Figure 8:
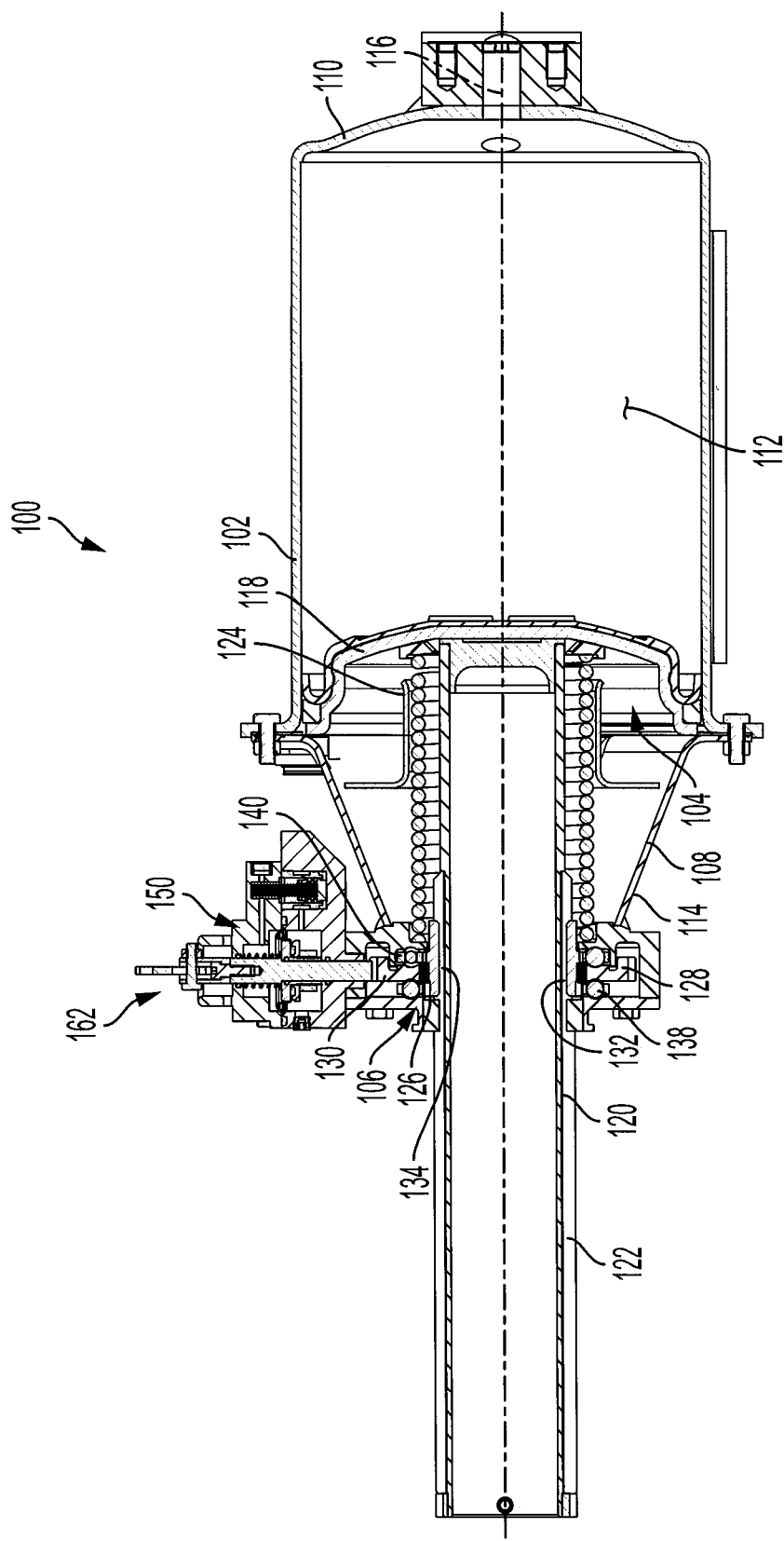
FIG. 8 is a cross-sectional view taken along line 7-7 in FIG. 6, showing a second position of a piston of the brake cylinder.
Figure 9:
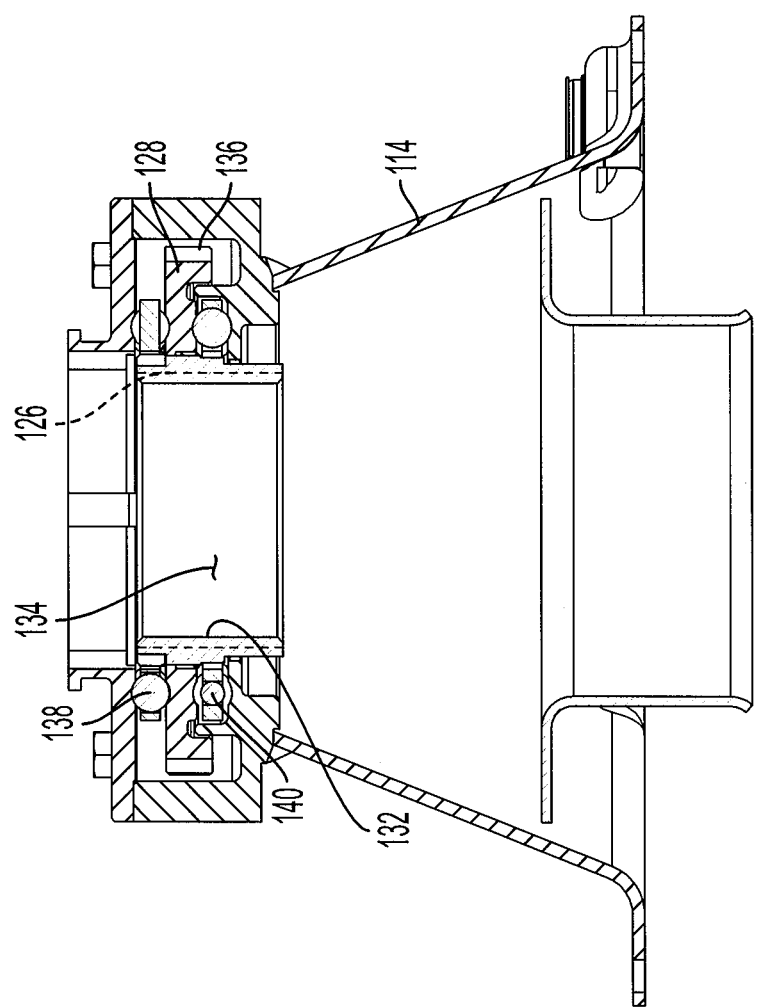
FIG. 9 is a partial cross-sectional view taken along line 7-7 in FIG. 6, showing a non-pressure head portion of the brake cylinder.
Figure 11:
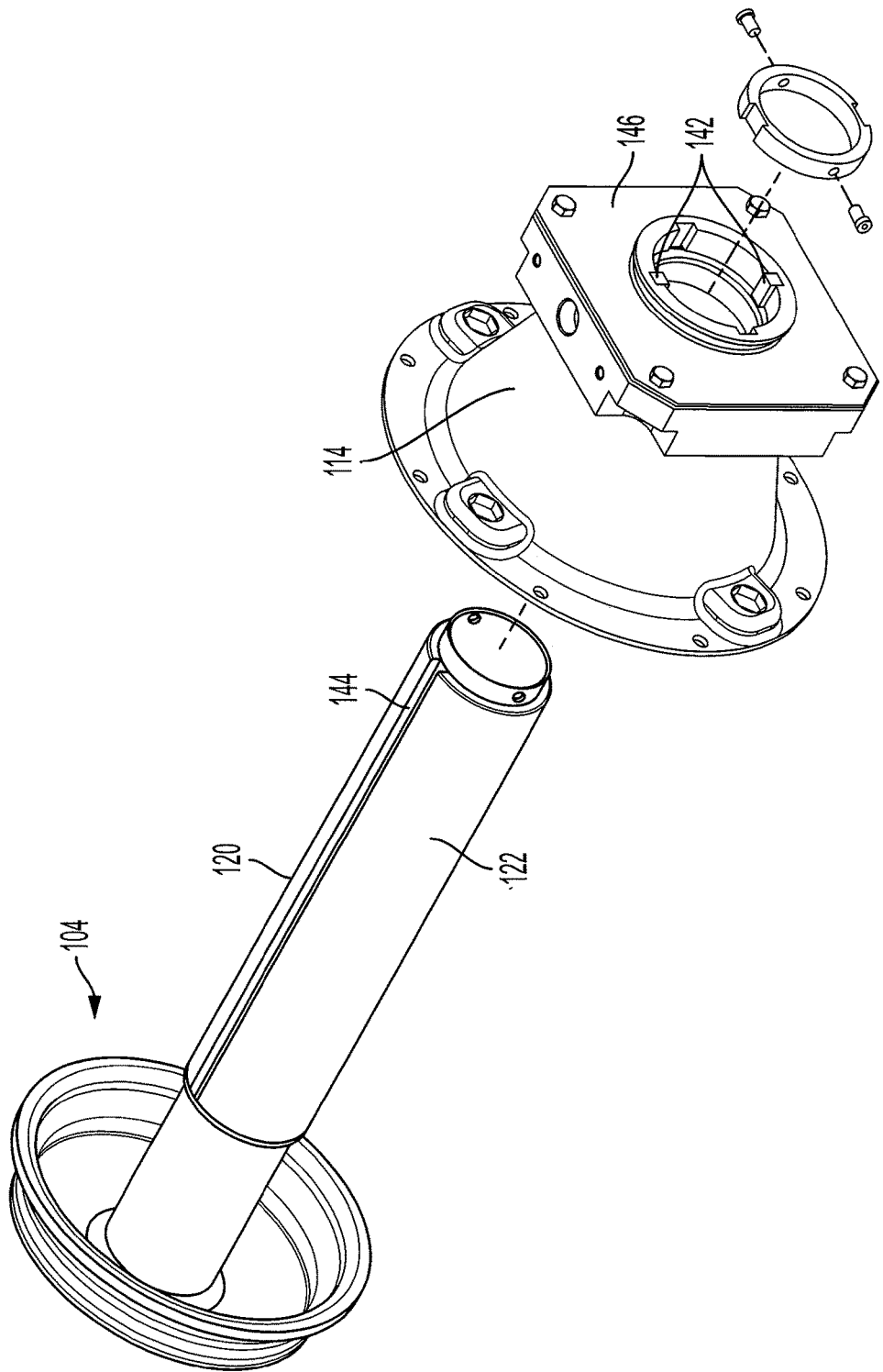
FIG. 11 is a partial exploded perspective view of the brake cylinder of FIG. 3, showing a key and keyway arrangement.
Figure 12:
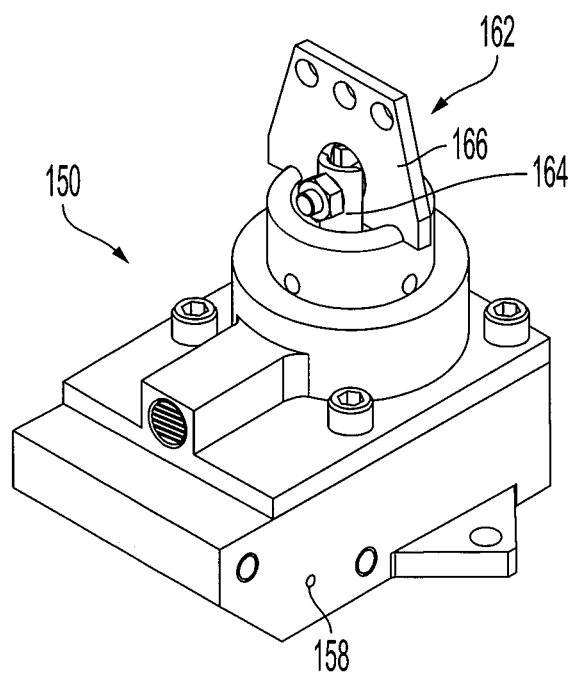
FIG. 12 is a perspective view of a parking brake locking mechanism according to one aspect of the present invention.
Figure 13:
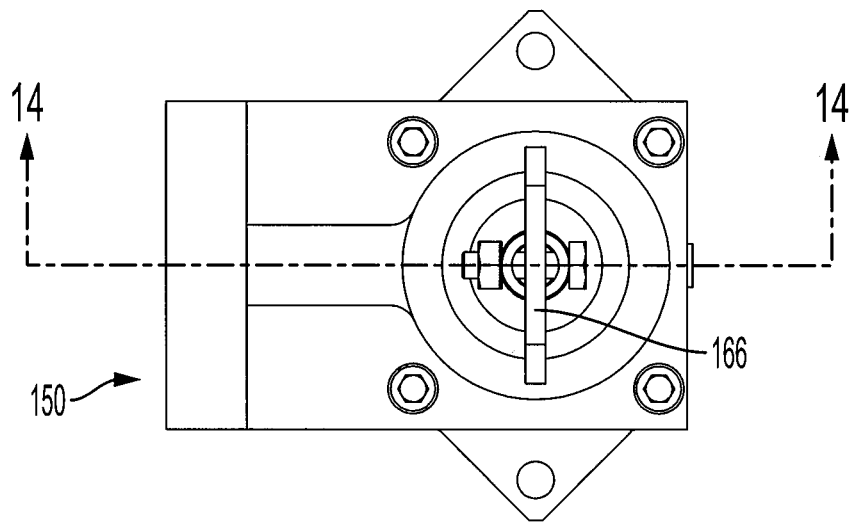
FIG. 13 is a top view of the parking brake locking mechanism of FIG. 12.
Figure 14:
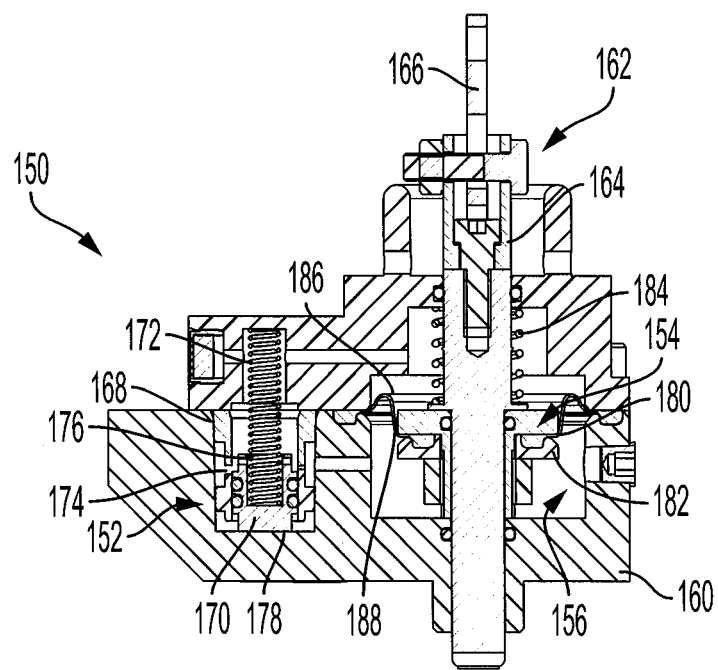
FIG. 14 is a cross-sectional view taken along line 14-14 in FIG. 13.
Figure 15:
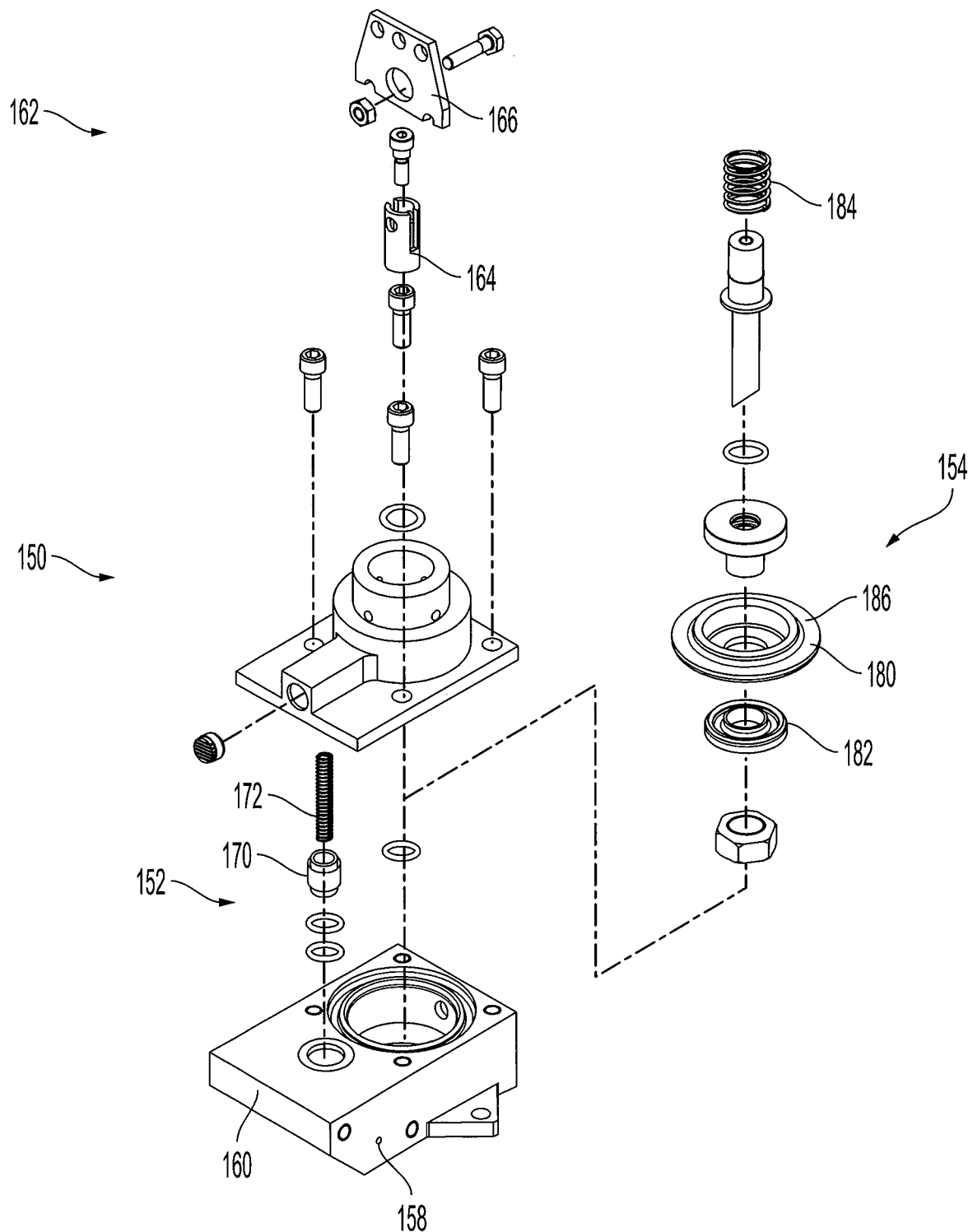
FIG. 15 is an exploded perspective view of the parking brake locking mechanism of FIG. 12.

Referring to FIGS. 6 and 11, the rod 120 is restricted from rotating about a longitudinal axis of the rod 120 relative to the body 102. In one aspect, the non-pressure head 114 of the body 102 includes at least one key 142 and the rod 120 includes at least one keyway 144 that receives the key 142, although the non-pressure head 114 of the body 102 may include the keyway 144 and the rod 120 may include the key 142. More specifically, a cover 146 of the non-pressure head 114 includes the at least one key 142, although other suitable configurations may be utilized. Engagement between the key 142 and the keyway 144 restricts rotation of the rod 120 about the longitudinal axis of the rod 120 relative to the body 102 while still allowing for axial movement of the rod 120 relative to the body 102 along the longitudinal axis of the rod 120. The key 142 and keyway 144 prevent rotation of the rod 120 and piston member 118, which prevents the rod 120 and piston member 118 from rotating and retracting toward the first position when the locking pawl 130 is engaged with the locking gear 128.

Referring to FIGS. 3-8 and 12-17, the brake cylinder with parking brake mechanism 100 further includes a locking pawl actuation assembly 150 configured to move the locking pawl 130 between the locked and unlocked positions based on a signal pressure. As noted above, the parking brake locking mechanism 106 is configured to be used as a standalone device that is a signaled using brake pipe air pressure or utilized in connection with an automatic parking brake pneumatic control valve, which would provide an on/off pressure signal to the parking brake locking mechanism 106. The locking pawl actuation assembly 150 includes a signal valve 152 and a pawl valve 154. The pawl valve 154 is in fluid communication with a locking cavity 156. The pawl valve 154 has a first position corresponding to the locked position of the locking pawl 130 and a second position corresponding to the unlocked position of the locking pawl 130. The signal valve 152 is in fluid communication with a signal pressure port 158. The signal pressure port 158 may be in fluid communication with a brake pipe pressure passageway or line (not shown) or may be in fluid communication with a signal passageway or line (not shown) from an automatic parking brake pneumatic control valve. The signal valve 152 has a first position where the locking cavity 156 is in fluid communication with atmospheric pressure and a second position where the locking cavity 156 is in fluid communication with the signal pressure port 158. The signal valve 152 and pawl valve 154 are received within a housing 160 secured to the non-pressure head 114 of the body 102 of the brake cylinder 100, although the signal valve 152 and pawl valve 154 may also be integrally formed with the non-pressure head 114 of the body 102 of the brake cylinder 100.

Referring to FIGS. 12-17, the locking pawl actuation assembly 150 further includes a manual release mechanism 162 configured to move the locking pawl 130 from the locked position to the unlocked position. The manual release mechanism 162 includes a swivel 164 secured to the locking pawl 130 and a rocking arm 166 secured to the swivel 164, although other suitable configurations may be utilized. The swivel 164 is rotatable relative to the locking pawl 130 about a longitudinal axis defined by the locking pawl 130. Movement of the rocking arm 166 along the longitudinal axis defined by the locking pawl 130 is configured to move the locking pawl 130 from the locked position to the unlocked position. The manual release mechanism 162 acts as an "override" to disengage the parking brake locking mechanism 106 and permit the rod 120 and piston member 118 to retract toward the first position thereby releasing the brakes of the railway vehicle. The manual release mechanism 162 is configured to fix the locking pawl 130 in the unlocked position to negate the automatic parking brake function such that the brake cylinder 100 operates conventionally. Movement of the rocking arm 166 may be accomplished via a cable, pull rod, or other suitable arrangement (not shown) that is connected to the rocking arm 166 and accessible from a side of the railway vehicle. The rocking arm 166 is configured to be fully rotatable 360 degrees to allow the manual release mechanism 162 to be actuated from any angle.

Referring again to FIGS. 12-17, the signal valve 152 includes a bushing 168, a spool valve member 170, and a signal spring 172, although other suitable valve arrangements may be utilized. The bushing 168 defines a bushing port 174 in fluid communication with the locking cavity 156. The signal spring 172 biases the signal valve 152 toward the first position. The spool valve member 170 has a first side 176 and a second side 178 positioned opposite from the first side 176, with the second side 178 of the spool valve member 170 in fluid communication with the signal pressure port 158. The spool valve member 170 isolates the bushing port 174 from the signal pressure port 158 when the spool valve member 170 is in the first position and allows fluid communication between the bushing port 174 and the signal pressure port 158 when the spool valve member 170 is in the second position. The pawl valve 154 includes a diaphragm 180, a pawl valve member 182 secured to the diaphragm 180, and a locking spring 184, although other suitable valve arrangements may be utilized. The diaphragm 180 has a first side 186 and a second side 188 positioned opposite the first side 186, with the first side 186 of the diaphragm 180 in fluid communication with atmospheric pressure and the second side 188 of the diaphragm 180 in fluid communication with the locking cavity 156. The locking spring 184 biases the locking pawl 130 toward the locked position. The pawl valve member 182 is configured to move the locking pawl 130 to the unlocked position when a pressure within the locking cavity 156 is greater than a biasing force of the locking spring 184.

Accordingly, the locking pawl actuation assembly 150 is configured to move the locking pawl 130 between the unlocked position and locked position based on a pressure provided by the signal pressure port 158. When the pressure from the signal pressure port 158, such as brake pipe pressure, exceeds the biasing force provided by the signal spring 172, the spool valve member 170 will move upwards to the second position to place the signal pressure port 158 in fluid communication with the locking cavity 156 thereby moving the diaphragm 180 and the pawl valve member 182 upwards to move the locking pawl 130 to the unlocked position. When the pressure from the signal pressure port 158 begins to drop, such as during a brake application, to a predetermined pressure, the spool valve member 170 is moved to the first position due to the signal spring 172 overcoming the force of the air pressure from the signal pressure port 158 thereby placing the locking cavity 156 in fluid communication with atmospheric pressure. With the locking cavity 156 in fluid communication with atmospheric pressure, the locking spring 184 biases the diaphragm 180 and pawl valve member 182 downward thereby moving the locking pawl 130 into engagement with the locking gear 128 and holding the brake system of the railway vehicle in an engaged state and retaining brake shoe force against the wheel of the railway vehicle. When utilizing an automatic parking brake pneumatic control valve, the locking pawl actuation assembly 150 is configured to engage immediately following an emergency brake application and remain applied during system charge and is configured to disengage when brake pipe pressure and auxiliary reservoir are recharged to predetermined pressures and remains released during partial and full-service brake applications.

Figure 18:
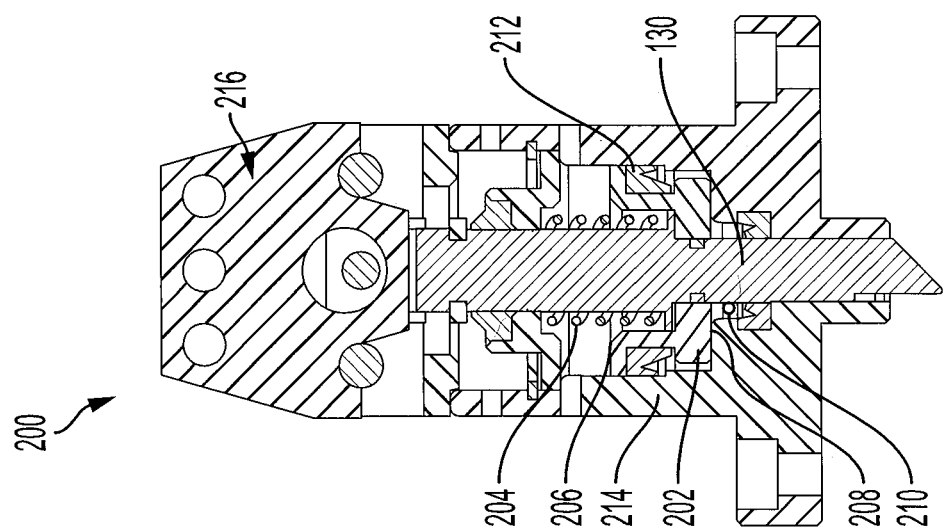
FIG. 18 is a cross-sectional view of a parking brake locking mechanism according to a second aspect of the present invention.

Referring to FIG. 18, according to a second aspect or embodiment of the present disclosure, the locking pawl actuation assembly 200 includes a valve member 202 and a locking spring 204, with the valve member 202 having a first side 206 and a second side 208 positioned opposite the first side 206. The second side 208 of the valve member 202 is in fluid communication with a signal pressure port 210 and the first side 206 of the valve member 202 is in fluid communication with atmospheric pressure. The locking spring 204 biases the locking pawl 130 toward the locked position, with the valve member 202 having a first position corresponding to the locked position of the locking pawl 130 and a second position corresponding to the unlocked position of the locking pawl 130. The valve member 202 is configured to move the locking pawl 130 to the unlocked position when a pressure acting on the second side 208 of the valve member 202 is greater than a biasing force of the locking spring 204. The valve member 202 of the locking pawl actuation assembly 200 includes a seal 212 and a valve body 214. The seal 212 may be a U-cup or O-ring, although other suitable seal arrangements may be utilized. The locking pawl actuation assembly 200 of FIG. 18 operates in a similar manner to the locking pawl actuation assembly 150 of FIGS. 12-17. Rather than providing the diaphragm 180, the locking pawl actuation assembly 200 utilizes the seal 212. The locking pawl actuation assembly 200 is shown in connection with a manual release mechanism 216 that is not rotatable such that the manual release can only be pulled horizontally, although the assembly 200 may also be provided with the manual release mechanism 162 of FIGS. 12-17.

Figure 19:
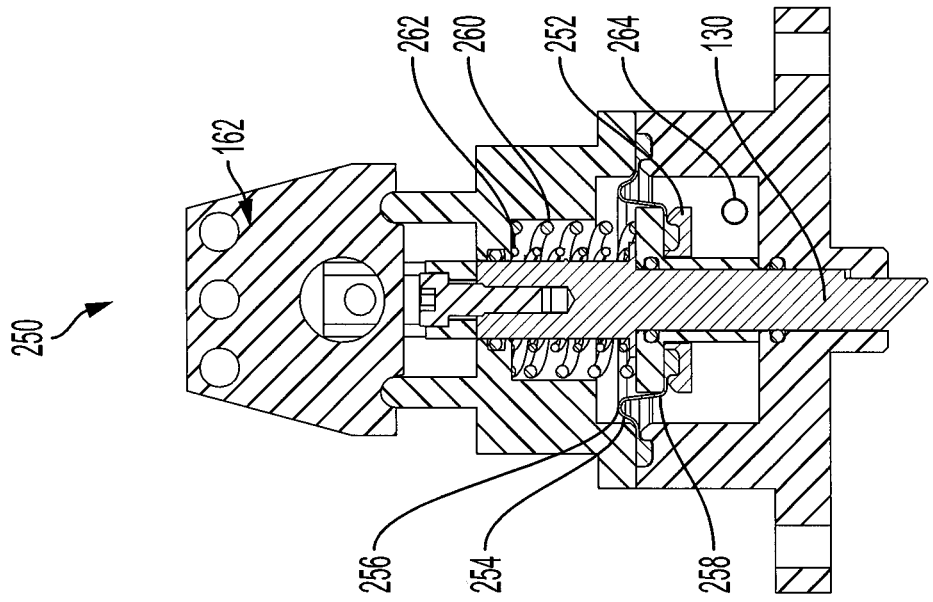
FIG. 19 is a cross-sectional view of a parking brake locking mechanism according to a third aspect of the present invention.

Referring to FIG. 19, according to a third aspect or embodiment of the present disclosure, a locking pawl actuation assembly 250 includes a valve member 252, a diaphragm 254 having a first side 256 and a second side 258 positioned opposite the first side 256, a signal spring 260, and a locking spring 262, with the valve member 252 having a first position corresponding to the locked position of the locking pawl 130 and a second position corresponding to the unlocked position of the locking pawl 130. The locking spring 262 biases the locking pawl 130 toward the locked position, with the signal spring 260 biasing the valve member 252 toward the first position. The second side 258 of the diaphragm 254 is in fluid communication with a signal pressure port 264 and the first side 256 of the diaphragm 254 is in fluid communication with atmospheric pressure. The locking pawl actuation assembly 250 of FIG. 19 operates in a similar manner to the locking pawl actuation assembly 150 of FIGS. 12-17. The valve member 252 is configured to move the locking pawl 130 to the unlocked position when a pressure acting on the second side 258 of the diaphragm 254 is greater than a biasing force of the signal spring 260 and the locking spring 262. The locking spring 262 is the only biasing force that opposes the manual release mechanism 162 to reduce the force required for manual release. The signal spring 260 primarily controls when the locking pawl 130 engages and disengages with the locking gear 128 based on the pressure from the signal pressure port 264, with the force from the locking spring 262 also playing a factor, although to a lesser extent than the signal spring 260.

Figure 20:
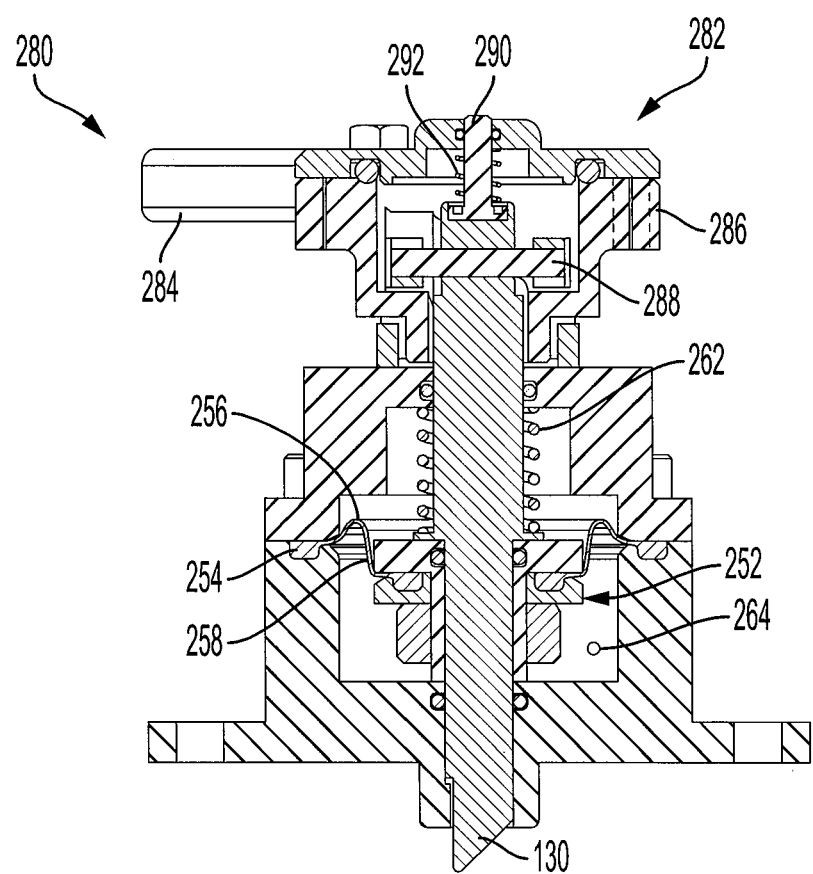
FIG. 20 is a cross-sectional view of a parking brake locking mechanism according to a fourth aspect of the present invention.

Referring to FIG. 20, according to a fourth aspect or embodiment of the present disclosure, a locking pawl actuation assembly 280 is similar to the locking pawl actuation assembly 250 of FIG. 19, except for differences noted below. Instead of including the manual release mechanism 162 with the swivel 164 and rocking arm 166, the locking pawl actuation assembly 280 includes a manual release mechanism 282 that is configured to be rotated to move the locking pawl 130 from the locked position to the unlocked position. The manual release mechanism 282 includes a handle 284 secured to a main body 286. The locking pawl 130 is secured to the main body 286 via a pin 288. Rotation of the handle 284, which in turn rotates the main body 286, about a longitudinal axis defined by the locking pawl 130 axially moves the locking pawl 130 from the locked position to the unlocked position. The manual release mechanism 282 may include a cam arrangement between the main body 286 and the pin 288 such that rotation of the main body 286 causes engagement between a cam (not shown) and the pin 288 thereby axially displacing the locking pawl 130 to the unlocked position.

The manual release mechanism 282 includes a post 290 received by the locking pawl 130 and a spring 292 that provides a biasing force between the handle 284 and the locking pawl 130. The spring 292 may be configured to reduce any lost motion in the manual release mechanism 282. The post 290, which moves with the locking pawl 130 when moved between the locked and unlocked positions, provides a visual indication when the pawl is in the unlocked position. More specifically, the post 290 is positioned within the main body 286 when the locking pawl 130 is in the locked position and extends from the main body 286 when the locking pawl 130 is in the unlocked position. The post 290 may be formed from a different color than the other components of the locking pawl actuation assembly 280. In one aspect, the post 290 is a dominant color, such as red or yellow.

While embodiments of brake cylinder and parking brake mechanism were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A brake cylinder for a vehicle, the brake cylinder comprising:
    a body having a first end and a second end;
    a piston assembly comprising a piston member received within the body and a rod having a threaded surface, the piston member having a first position and a second position spaced from the first position in a direction extending from the second end of the body toward the first end of the body, at least a portion of the rod extending from the body when the piston member is in the second position;
    a parking brake locking mechanism comprising a working nut, a locking gear, and a locking pawl, the working nut having a threaded surface engaged with the threaded surface of the rod, the working nut is fixed relative to the locking gear, the working nut and the locking gear are moveable relative to the rod, the locking pawl having an unlocked position spaced from the locking gear and a locked position engaged with the locking gear, wherein the piston member is restricted from moving from the second position to the first position when the locking pawl is in the locked position; and
    a locking pawl actuation assembly disposed within a housing operably coupled with the body, the locking pawl actuation assembly comprising a housing, wherein at least a portion of the locking pawl extends through the housing, the locking pawl actuation assembly configured to automatically control movement of the locking pawl between the unlocked position and the locked position.

2. The brake cylinder of claim 1, wherein the piston member is moveable from the second position to the first position when the locking pawl is in the unlocked position.

3. The brake cylinder of claim 1, wherein the piston member is moveable from the first position to the second position when the locking pawl is in the locked position.

4. The brake cylinder of claim 3, wherein the locking gear comprises a plurality of teeth spaced around a circumference of the locking gear, the locking pawl configured to engage one of the plurality of teeth when the locking pawl is in the locked position to prevent movement of the piston member from the second position to the first position, the locking pawl configured to engage one of the plurality of teeth when the locking pawl is in the locked position and allow movement of the locking pawl and movement of the piston member from the first position to the second position.

5. The brake cylinder of claim 4, further comprising at least one bearing engaged with at least one of the working nut and the locking gear.

6. The brake cylinder of claim 1, wherein the body comprises a non-pressure head, the working nut and the locking gear received within the non-pressure head.

7. The brake cylinder of claim 1, wherein the rod is restricted from rotating about a longitudinal axis of the rod relative to the body.

8. The brake cylinder of claim 7, wherein the body comprises one of a key and a keyway, and wherein the rod comprises the other of the key and the keyway, the key is received within the keyway and restricts rotation of the rod about the longitudinal axis of the rod relative to the body.

9. The brake cylinder of claim 1, wherein the locking pawl actuation assembly is configured to automatically control movement of the locking pawl between the locked and unlocked positions based on a signal pressure.

10. The brake cylinder of claim 1, wherein the locking pawl actuation assembly comprises a signal valve and a pawl valve, the pawl valve is in fluid communication with a locking cavity, the pawl valve has a first position corresponding to the locked position of the locking pawl and a second position corresponding to the unlocked position of the locking pawl, the signal valve is in fluid communication with a signal pressure port, the signal valve has a first position where the locking cavity is in fluid communication with atmospheric pressure and a second position where the locking cavity is in fluid communication with the signal pressure port.

11. The brake cylinder of claim 1, wherein the locking pawl actuation assembly comprises a manual release mechanism configured to move the locking pawl from the locked position to the unlocked position.

12. The brake cylinder of claim 11, wherein the manual release mechanism comprises a swivel secured to the locking pawl and a rocking arm secured to the swivel, the swivel rotatable relative to the locking pawl about a longitudinal axis defined by the locking pawl, and wherein movement of the rocking arm along the longitudinal axis defined by the locking pawl is configured to move the locking pawl from the locked position to the unlocked position.

13. The brake cylinder of claim 10, wherein the signal valve comprises a bushing, a spool valve member, and a signal spring, the bushing defining a bushing port in fluid communication with the locking cavity, the signal spring biasing the signal valve toward the first position, the spool valve member having a first side and a second side position opposite from the first side, the second side of the spool valve member in fluid communication with the signal pressure port, the spool valve member isolating the bushing port from the signal pressure port when the spool valve is in the first position, the spool valve member allowing fluid communication between the bushing port and the signal pressure port when the spool valve is in the second position.

14. The brake cylinder of claim 10, wherein the pawl valve comprises a diaphragm, a pawl valve member secured to the diaphragm, and a locking spring, the diaphragm having a first side and a second side positioned opposite the first side, the first side of the diaphragm in fluid communication with atmospheric pressure, the second side of the diaphragm in fluid communication with the locking cavity, the locking spring biasing the locking pawl toward the locked position, the pawl valve member configured to move the locking pawl to the unlocked position when a pressure within the locking cavity is greater than a biasing force of the locking spring.

15. The brake cylinder of claim 1, wherein the locking pawl actuation assembly comprises a valve member and a locking spring, the valve member having a first side and a second side positioned opposite the first side, the second side of the valve member in fluid communication with a signal pressure port, the first side of the valve member in fluid communication with atmospheric pressure, the locking spring biasing the locking pawl toward the locked position, the valve member having a first position corresponding to the locked position of the locking pawl and a second position corresponding to the unlocked position of the locking pawl, the valve member configured to move the locking pawl to the unlocked position when a pressure acting on the second side of the valve member is greater than a biasing force of the locking spring.

16. A brake cylinder for a vehicle, the brake cylinder comprising:
a body having a first end and a second end;
a piston assembly comprising a piston member received within the body and a rod having a threaded surface, the piston member having a first position and a second position spaced from the first position in a direction extending from the second end of the body toward the first end of the body, at least a portion of the rod extending from the body when the piston member is in the second position;
a parking brake locking mechanism comprising a working nut, a locking gear, and a locking pawl, the working nut coupled to the rod, the working nut is fixed relative to the locking gear, the working nut and the locking gear are moveable relative to the rod, the locking pawl having an unlocked position and a locked position, wherein the piston member is restricted from moving from the second position to the first position when the locking pawl is in the locked position; and
a locking pawl actuation assembly disposed within a housing and operably coupled with the body, wherein at least a portion of the locking pawl extends through the housing, the locking pawl actuation assembly configured to control movement of the locking pawl between the unlocked position and the locked position.

17. The brake cylinder of claim 16, wherein the piston member is moveable from the second position to the first position when the locking pawl is in the unlocked position, and the piston member is moveable from the first position to the second position when the locking pawl is in the locked position.

18. The brake cylinder of claim 16, wherein the locking gear comprises a plurality of teeth spaced around a circumference of the locking gear, the locking pawl configured to engage one of the plurality of teeth when the locking pawl is in the locked position to prevent movement of the piston member from the second position to the first position, the locking pawl configured to engage one of the plurality of teeth when the locking pawl is in the locked position and allow movement of the locking pawl and movement of the piston member from the first position to the second position.

19. The brake cylinder of claim 16, wherein the rod is restricted from rotating about a longitudinal axis of the rod relative to the body.

20. The brake cylinder of claim 16, wherein the locking pawl actuation assembly is configured to move the locking pawl between the locked and unlocked positions based on a signal pressure.

* * * * *